United States Patent [19]
Betts et al.

[11] 3,968,646
[45] July 13, 1976

[54] NOISE CONTROLLABLE NOZZLE CLOSURE

[75] Inventors: Robert E. Betts, Huntsville; Lawrence B. Thorn, Madison; Albert R. Maykut, Huntsville, all of Ala.

[73] Assignee: The United States of America as represented by the Secretary of the Army, Washington, D.C.

[22] Filed: June 28, 1974

[21] Appl. No.: 484,035

[52] U.S. Cl............... 60/271; 239/265.15; 102/49.3
[51] Int. Cl.² ............ F02K 1/00; F02K 1/26
[58] Field of Search............ 60/271; 239/265.15; 222/529; 102/49.3, 49.7, 49.8

[56] References Cited
UNITED STATES PATENTS

| | | | |
|---|---|---|---|
| 2,828,604 | 4/1958 | Hirsch | 239/265.15 |
| 3,020,710 | 2/1962 | Herzog | 60/271 |
| 3,121,310 | 2/1964 | Rice | 60/271 |
| 3,170,288 | 2/1965 | Penza | 60/271 |
| 3,228,334 | 1/1966 | Oss | 239/265.15 |
| 3,372,548 | 3/1968 | Mathis | 60/271 |
| 3,468,127 | 9/1969 | Rosser | 239/265.15 |

Primary Examiner—Carlton R. Croyle
Assistant Examiner—L. T. Casaregola
Attorney, Agent, or Firm—Nathan Edelberg; Robert P. Gibson; Harold W. Hilton

[57] ABSTRACT

A rocket motor nozzle closure for controlling the initial release of pressure from the rocket motor nozzle to reduce the occurrence of high pressure shock fronts which are detrimental to the weapon operator. The mass and geometry of the nozzle closure are predetermined to fit the desired motor performance. The release of motor pressure is controlled by the rate of change of momentum of the nozzle closure.

1 Claim, 13 Drawing Figures

NOISE CONTROLLABLE NOZZLE CLOSURE

BACKGROUND OF THE INVENTION

Rocket motor ignition is normally controlled by utilizing an igniter which gives a controlled rate of heat release which simultaneously pressurizes the motor. Nozzle closures are used to aid ignition by retaining the igniter action until proper motor pressure is obtained. The nozzle closures normally used are metal or plastic and are retained in the nozzle by mechanical design or adhesives. When the desired pressure is reached, the closure is ruptured, sheared, extruded or overcomes the bond strength if adhesive is used. Such method of motor opening can generate an unacceptable noise level.

The present invention relates to nozzle closures which reduce and control the noise level generated by rocket motors during ignition by incrementally or continuously opening the motor.

Such closures are used to reduce the shock wave effect produced internally and externally to the motor. This is particularly advantageous for motors which operate near personnel.

SUMMARY OF THE INVENTION

A nozzle closure for rocket motors that incrementally or continuously opens the nozzle of the motor for controlling the initial release of pressure therefrom. The closure includes a forward portion extending into the motor and an aft portion extending rearwardly into the exit portion of the nozzle. The mass and geometry of both the forward and aft sections are predetermined to control the pressure release by rate of change of momentum of the closure during motor ignition.

DESCRIPTION OF THE PREFERRED EMBODIMENTS

Figure 1:
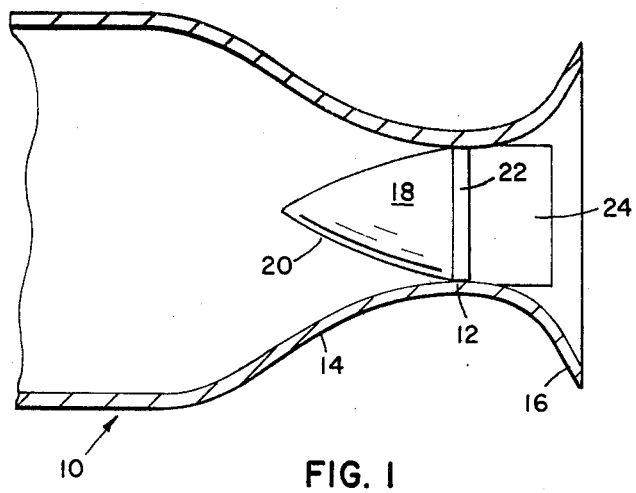
FIG. 1 is an elevational sectional view of an illustrative embodiment of the present invention.

As shown in FIG. 1, a rocket motor 10 includes a nozzle having a throat 12, an entrance section 14 and an exit section 16. A nozzle closure member 18 is mounted in the nozzle. A typical configuration includes a forward section 20 carried in the entrance section of the nozzle, a central section 22 which configurations range from contours and straight sections of zero to some given length, and an aft section 24. FIG. 1 is illustrative of the mounting and configurations of the closure members shown in FIGS. 2-13.

Figure 2:
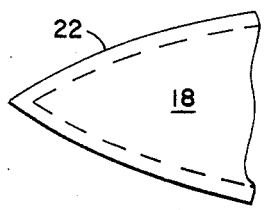
FIGS. 2-9 are elevational sectional views of various configurations of the forward sections of the nozzle closure.

As shown in FIG. 2, forward section 18 of the nozzle closure is provided with a curved surface 22 having an ogival configuration. The section is hollow to provide the closure member with less mass than the solid forward section as shown in FIG. 1. A closure member having less mass provides for less destructive debris in the blast. The curved configuration of the forward closure member of FIG. 2 provides a linear opening of the nozzle.

Figure 3:
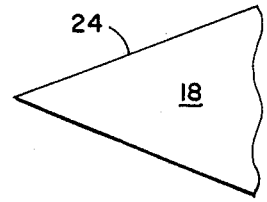

FIG. 3 illustrates a forward closure member having surface 22 having a conical configuration which provides for an exponential opening of the nozzle.

Figure 4:
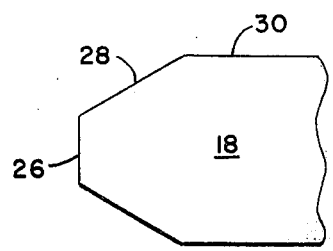

FIG. 4 illustrates a forward closure member having conical section blunt forward end 26 and conical section 28 and a cylindrical portion 30. Cylindrical portion 30 provides for instantaneous opening of the nozzle while conical section 28 permits exponential opening.

Figure 5:
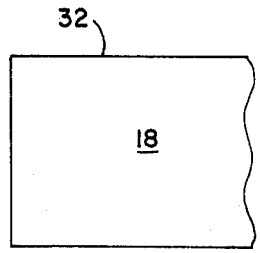
Figure 6:
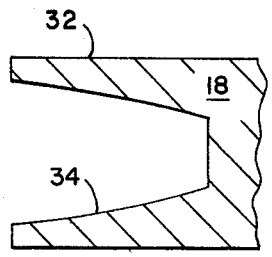

FIGS. 5 and 6 illustrate the forward portion of the closure member having cylindrical surfaces 32. The configuration of the embodiment of FIG. 5 is solid while the configuration of the embodiment of FIG. 6 provides a hollowed out space 34 to provide a member of less mass. Both of these configurations provide for instantaneous opening of the nozzle.

Figure 7:
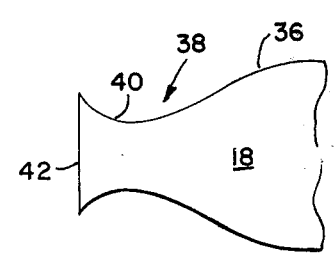

As seen in FIG. 7 forward nozzle closure member 18 includes an ogival portion 36, an intermediate section 38 which is curved to provide a smaller diameter at the central portion 40 and a blunt end 42. This configuration provides a variable nozzle opening.

Figure 8:
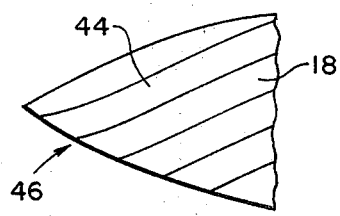

FIG. 8 discloses a forward closure member 18 of substantially conical configuration having grooves 44 disposed in substantially a helical configuration on the surface 46 of the closure member. The grooves impart a spin to the closure member which provides more drag and reduces the debris.

Figure 9:
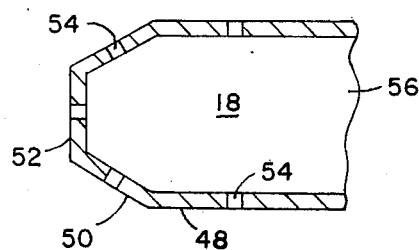

FIG. 9 illustrates a forward closure member 18 having a substantially cylindrical portion 48, a cylindrical portion 50 and blunt portion 52. Apertures 52 are provided in the member in communication with the combustion chamber and a hollow portion 56 of the closure member. The vent holes allow some gas to escape prior to expulsion of the closure member from the nozzle.

FIGS. 10-13 illustrate various configurations of the aft portion 24 of the closure member. In these Figures it is seen that the aft portion is provided with various configurations which effect the mass and drag of the aft closure member.

Figure 10:
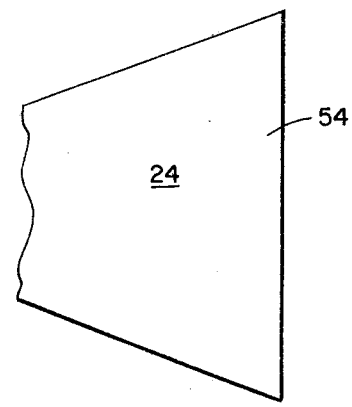
FIGS. 10-13 are elevational sectional views of various configurations of the aft sections of the nozzle closure.
Figure 11:
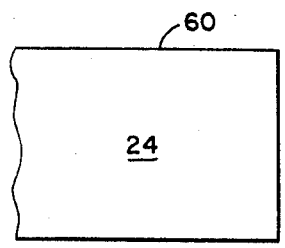
Figure 12:
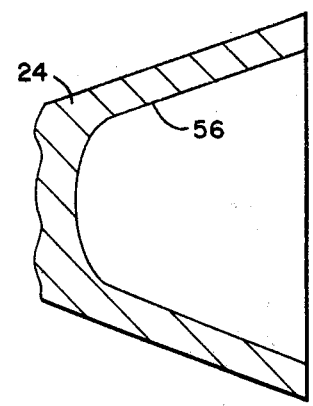
Figure 13:
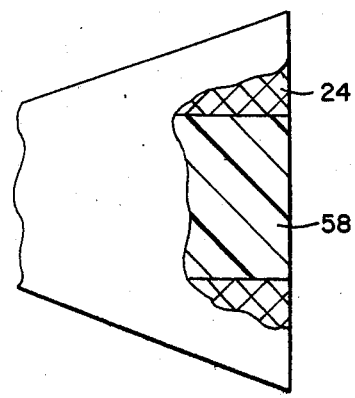

FIGS. 10, 12 and 13 discloses aft sections having substantially frusto conical configurations. Aft portion 24 (FIG. 10) illustrates a solid portion 54. FIG. 12 is provided with a hollowed out portion 56 to provide an aft section which will be of less mass than the solid aft section of FIG. 10. As seen in FIG. 13 a variable mass 58 is incorporated in the aft section. The weight and material of the variable mass is dependent upon the specific motor characteristics. The aft section of FIG. 11 is solid with a cylindrical surface 60.

It is to be understood that in the nozzle closures any of the aft sections shown can be combined with any of the forward sections shown. The choice depends on the motor characteristics, it only being required that the nozzle closures produce controlled opening in a predetermined manner. Since such opening is controllable by the overall density, configuration, and overall mass, low density closures can be used to give high motor pressure or vice versa.

I claim:

1. In a rocket motor having a nozzle including an entrance section, a throat section and an exit section, closure means for controlling the opening of said nozzle responsive to ignition of said rocket motor comprising:
   a. a forward section disposed in said entrance section of said nozzle, said forward section having an ogival configuration having helical grooves on the outer surface thereof;
   b. an intermediate section disposed in said throat section; and,
   c. an aft section disposed in said exit section of said nozzle, said aft section having a solid frusto-conical configuration.

* * * * *